US012699002B2

(12) United States Patent
Chiang

(10) Patent No.: US 12,699,002 B2
(45) Date of Patent: Aug. 4, 2026

(54) LIGHT DETECTION METHOD WITH AUTOMATIC EXPOSURE DETECTION (AED) SCAN MODE

(71) Applicant: InnoCare Optoelectronics Corporation, Tainan City (TW)

(72) Inventor: Yi-Hung Chiang, Tainan City (TW)

(73) Assignee: InnoCare Optoelectronics Corporation, Tainan City (TW)

( * ) Notice: Subject to any disclaimer, the term of this patent is extended or adjusted under 35 U.S.C. 154(b) by 177 days.

(21) Appl. No.: 18/502,096

(22) Filed: Nov. 6, 2023

(65) Prior Publication Data

US 2024/0192050 A1 Jun. 13, 2024

(30) Foreign Application Priority Data

Dec. 12, 2022 (TW) .................................. 111147601

(51) Int. Cl.
    G01J 1/02 (2006.01)
    G01J 1/04 (2006.01)
    (Continued)

(52) U.S. Cl.
    CPC ........... G01J 1/0238 (2013.01); G01J 1/0403 (2013.01); G01J 1/44 (2013.01); H04N 25/40 (2023.01);
    (Continued)

(58) Field of Classification Search
    CPC .......... G01J 1/0238; G01J 1/0403; G01J 1/44; G01J 2001/4433; H04N 25/40; H04N 25/53
    See application file for complete search history.

(56) References Cited

U.S. PATENT DOCUMENTS

| | | | |
|---|---|---|---|
| 2008/0013686 A1* | 1/2008 | Kameshima | ........ G01T 1/20184 |
| | | | 378/98 |
| 2015/0243207 A1 | 8/2015 | Kim | |

(Continued)

FOREIGN PATENT DOCUMENTS

| | | |
|---|---|---|
| CN | 1745575 | 3/2006 |
| CN | 110346039 | 10/2019 |
| TW | 201140400 | 11/2011 |

OTHER PUBLICATIONS

"Office Action of Taiwan Counterpart Application", issued on Oct. 28, 2024, p. 1-p. 10.

*Primary Examiner* — Jennifer D Bennett
(74) *Attorney, Agent, or Firm* — JCIPRNET

(57) ABSTRACT

A light detection method for a light detection device is provided. The light detection device includes multiple scan lines and multiple light sensing elements. Each of the light sensing elements is coupled to a corresponding one of the scan lines. The light detection method includes: in a detection mode, sequentially scanning a first scan line to a $(N+1)^{th}$ scan line among the scan lines, wherein a $N^{th}$ scan line is not adjacent to at least one of a $(N-1)^{th}$ scan line and the $(N+1)^{th}$ scan line; reading signals of the light sensing elements coupled to the first scan line to the $(N+1)^{th}$ scan line; determining whether the signals meet an exposure standard; and controlling the light detection device to enter a value reading mode when the signals meet the exposure standard.

18 Claims, 11 Drawing Sheets

(51) Int. Cl.
    G01J 1/44                (2006.01)
    H04N 25/40            (2023.01)
    H04N 25/53            (2023.01)

(52) U.S. Cl.
    CPC ...... H04N 25/53 (2023.01); *G01J 2001/4433*
                                              (2013.01)

(56)                  References Cited

U.S. PATENT DOCUMENTS

| | | | |
|---|---|---|---|
| 2018/0323225 A1* | 11/2018 | Nakamura | H04N 25/531 |
| 2019/0029618 A1* | 1/2019 | Sato | H04N 25/53 |
| 2021/0097328 A1 | 4/2021 | Mori | |
| 2023/0388675 A1* | 11/2023 | Tojima | G01S 7/4863 |

\* cited by examiner

LIGHT DETECTION METHOD WITH AUTOMATIC EXPOSURE DETECTION (AED) SCAN MODE

CROSS-REFERENCE TO RELATED APPLICATION

This application claims the priority benefit of Taiwan application serial no. 111147601, filed on Dec. 12, 2022. The entirety of the above-mentioned patent application is hereby incorporated by reference herein and made a part of this specification.

BACKGROUND

Technical Field

The disclosure relates to a light detection method, and more particularly, to a light detection method for a light detection device.

Description of Related Art

Some light detection devices may use automatic exposure detection (AED) to determine whether a light emitting device provides emitted light to irradiate the light detection device. Generally, in a detection mode, adjacent scan lines in a panel are scanned sequentially, and signals in light detection units connected to these scan lines are read out sequentially. It is determined whether the light detection device receives the emitted light provided by the light emitting device (such as a UV light emitting device) according to the signals. However, in the detection mode, since the adjacent scan lines in the panel are sequentially scanned, and the signals in the light detection units connected to these scan lines are sequentially read out, these read out signals may probably cause a generated signal image to have a wider abnormal image (or loss image) in a value reading mode. The wider loss image is difficult to be compensated. Therefore, the current AED scan mode is required to be improved.

SUMMARY

The disclosure provides a light detection method with an improved automatic exposure detection (AED) scan mode.

The disclosure provides a light detection method for a light detection device. The light detection device includes multiple scan lines and multiple light sensing elements. Each of the light sensing elements is coupled to a corresponding one of the scan lines. The scan lines are electrically connected to a driving circuit. The light detection method includes the following. In a detection mode, a first scan line to a $(N+1)^{th}$ scan line among the scan lines are sequentially scanned. A $N^{th}$ scan line is not adjacent to at least one of a $(N-1)^{th}$ scan line and the $(N+1)^{th}$ scan line. Multiple signals of the light sensing elements coupled to the first scan line to the $(N+1)^{th}$ scan line are read. Whether the signals meet an exposure standard is determined. The light detection device is controlled to enter a value reading mode when the signals meet the exposure standard.

The disclosure provides a light detection method for a light detection device. The light detection device includes multiple scan lines and multiple light sensing elements. Each of the light sensing elements is coupled to a corresponding one of the scan lines. The scan lines are electrically connected to a driving circuit. The light detection method includes the following. In a detection mode, a first scan line and a second scan line among the scan lines are sequentially scanned. The first scan line is not adjacent to the second scan line. Multiple signals of the light sensing elements coupled to the first scan line and the second scan line are read. Whether the signals meet an exposure standard is determined. The light detection device is controlled to enter a value reading mode when the signals meet the exposure standard.

In order for the aforementioned features and advantages of the disclosure to be more comprehensible, several embodiments accompanied with drawings are described in detail as follows.

DESCRIPTION OF THE EMBODIMENTS

Figure 1:
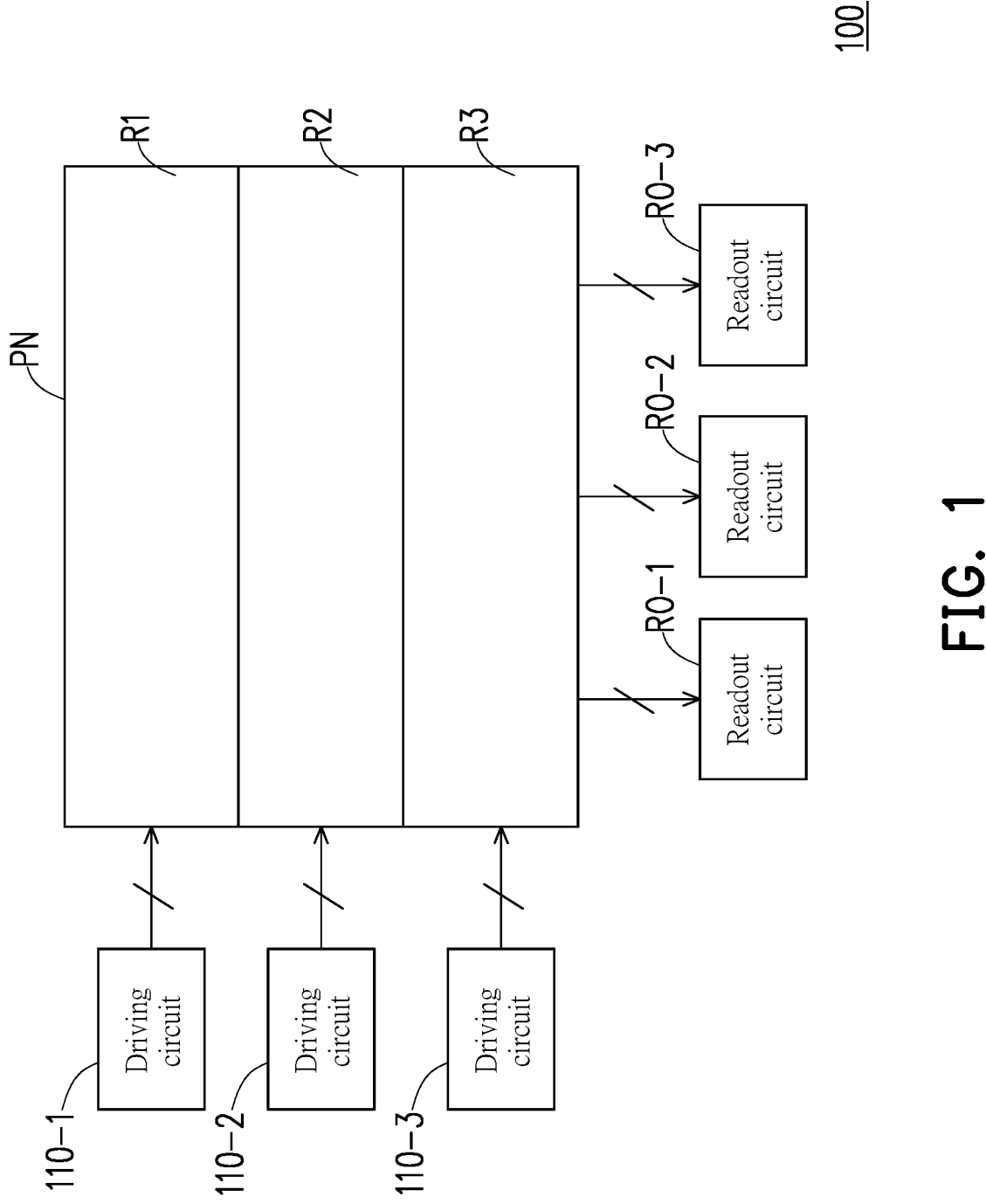
FIG. 1 is a schematic diagram of a light detection device according to a first embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the claims of the disclosure.

Certain terms are used throughout the specification of the disclosure and the appended claims to refer to specific components. Those skilled in the art should understand that electronic device manufacturers may probably use different names to refer to the same components. This specification is not intended to distinguish between components that have the same function but different names. In the following specification and claims, the terms "including", "containing", "having", etc., are open terms, so that they should be interpreted as meaning of "including but not limited to . . . ".

Directional terminology mentioned in the specification, such as "top", "bottom", "front", "back", "left", "right", etc., is used with reference to the orientation of the figures being described. Therefore, the used directional terminology is only illustrative, and is not intended to be limiting of the disclosure. In the figures, the drawings illustrate general characteristics of methods, structures, and/or materials used in specific embodiments. However, these drawings should not be construed as defining or limiting of a scope or nature covered by these embodiments. For example, for clarity's sake, a relative size, a thickness and a location of each film layer, area and/or structure may be reduced or enlarged.

In some embodiments of the disclosure, terms about bonding and connecting, such as "bonding", "connecting", "interconnecting", etc., unless otherwise specified, may refer to direct contact between two structures, or may also refer to indirect contact between the two structures, and there are other structures located between the two structures. And the terms about bonding and connecting may also include a situation that both structures are movable, or both structures are fixed. In addition, the term "couple" includes any direct or indirect electrical connection means. In the case of direct electrical connection, terminals of components on the two circuits are directly connected or connected to each other with a conductor line segment, while in the case of indirect electrical connection, there are switches, diodes, capacitors, inductors, resistors, other suitable elements, or a combination of the above elements between the terminals of the components on the two circuits, but the disclosure is not limited thereto.

The terms "about", "equal to", "equivalent" or "identical", "substantially" or "approximately" are generally interpreted as being within a range of 20% of a given value or range, or as being within a range of 10%, 5%, 3%, 2%, 1%, or 0.5% of the given value or range.

In the disclosure, the thickness, length and width may be measured by using an optical microscope (OM), and the thickness or width may be obtained by measuring cross-sectional images in an electron microscope, but the disclosure is not limited thereto. In addition, any two values or directions used for comparison may have certain errors. In addition, the terms "a given range is from a first numerical value to the second numerical value" and "the given range falls within a range from the first numerical value to the second numerical value" mean that the given range includes the first numerical value, the second numerical value and other values there between. If a first direction is perpendicular to a second direction, an angle between the first direction and the second direction may be between 80 degrees and 100 degrees; if the first direction is parallel to the second direction, the angle between the first direction and the second direction may be between 0 degree and 10 degrees.

The ordinal numbers used in the specification and claims, such as "first", "second", etc., are used to modify components, and do not imply and represent the component or these components have any previous ordinal numbers, and do not represent a sequence of one component with another, or a sequence in a manufacturing method. The use of these ordinal numbers is only to make a clear distinction between a component with a certain name and another component with the same name. The same terms may not be used in the claims and the specification, and accordingly, a first component in the specification may be a second component in the claims. It should be noted that in the following embodiments, without departing from the spirit of the disclosure, technical features in several different embodiments may be replaced, reorganized, and mixed to complete other embodiments.

It should be noted that in the following embodiments, without departing from the spirit of the disclosure, technical features in several different embodiments may be replaced, reorganized, and mixed to complete other embodiments. As long as the features of the various embodiments do not violate the spirit of the invention or conflict with each other, they may be mixed and matched arbitrarily.

Unless otherwise defined, all terms (including technical terms and scientific terms) used herein have the same meanings commonly understood by those with ordinary knowledge in the technical field to which the disclosure belongs. It will also be understood that these terms, such as those defined in commonly used dictionaries, should be interpreted as having meanings that are consistent with the related technology and the background or context of the disclosure, and should not be interpreted in an idealized or overly formal manner, unless specifically defined herein. The electronic device disclosed herein may include a display device, a backlight device, an antenna device, a sensing/detection device (such as a light detection device) or a splicing device, but the disclosure is not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing/detecting device may be a device for sensing capacitance, light, thermal energy or ultrasonic waves, but the disclosure is not limited thereto. The light detection device may include an X-ray light detection device, an infrared light detection device or other suitable light detection devices. In the disclosure, the electronic device may include electronic components, and the electronic components may include passive components and active components, such as capacitors, resistors, inductors, diodes, transistors, etc. The diodes may include light emitting diodes or photodiodes. The light emitting diodes may, for example, include organic light emitting diodes (OLEDs), mini LEDs, micro LEDs or quantum dot LEDs, but the disclosure is not limited thereto. The splicing device may be, for example, a display splicing device or an antenna splicing device, but the disclosure is not limited thereto. It should be noted that the electronic device may be any permutation and combination of the aforementioned devices, but the disclosure is not limited thereto. In the following description, the detection device is used as an electronic device or a splicing device to illustrate the content of the disclosure, but the disclosure is not limited thereto.

Referring to FIG. 1, FIG. 1 is a schematic diagram of a light detection device according to a first embodiment of the disclosure. In the embodiment, a light detection device 100 includes a detection panel PN, at least one driving circuit (for example, driving circuits 110-1 to 110-3), and at least one readout circuit (for example, readout circuits RO-1 to RO-3). In FIG. 1, there are three driving circuits (such as the driving circuits 110-1 to 110-3) and three readout circuits RO-1 to RO-3, but the disclosure is not limited thereto, the numbers of the driving circuits and the readout circuits may be adjusted according to actual requirements. In the embodiment, the detection panel PN includes multiple light sensing elements SD (not shown in FIG. 1, referring to FIG. 2) connected to transistors (not shown), but the disclosure is not limited thereto. The detection panel PN is, for example, roughly divided into regions R1 to R3 according to the number of the driving circuits, but the disclosure is not limited thereto. The number of divided regions of the detection panel PN may be adjusted according to actual requirements. The driving circuit 110-1 may be used to drive multiple light sensing elements SD in the region R1 (not shown in FIG. 1, referring to FIG. 2), the driving circuit 110-2 may be used to drive multiple light sensing elements in the region R2, and the driving circuit 110-3 may be used to drive multiple light sensing elements in the region R3. The light sensing element SD includes, for example, a diode, such as a photodiode, but the disclosure is not limited thereto. For example, the light sensing element SD may include a lower electrode (not shown), an active layer (not shown) and an upper electrode (not shown) stacked in sequence. The active layer may be, for example, a laminated structure (such as a PIN photodiode) composed of a P-type semiconductor, an intrinsic semiconductor and an N-type semiconductor, but the disclosure is not limited thereto.

In the embodiment, the light detection device 100 may perform an automatic exposure detection (AED) operation in a detection mode to determine whether the detected emitted light (such as X-ray, infrared ray or other suitable emitted light, but the disclosure is not limited thereto) is provided to the light detection device 100 (such as the detection panel PN). When the light sensing elements SD of the detection panel PN receive the emitted light with sufficient intensity, the light detection device 100 may determine that an exposure standard is met. When it is determined that the exposure standard is met, the light detection device 100 may enter a value reading mode to obtain a detection image.

In the detection mode, taking the driving circuit 110-1 as an example, the driving circuit 110-1, for example, scans multiple light sensing element rows in the region R1 in a discrete scan manner. Subsequently, the readout circuits RO-1 to RO-3 may, for example, read signals from the light sensing elements connected to the light sensing element rows. The discrete scan manner will be described in detail with reference of FIG. 2.

Similar to the driving circuit 110-1, the driving circuit 110-2 scans the light sensing element rows in the region R2 in the discrete scan manner. The driving circuit 110-3 scans the light sensing element rows in the region R3 in the discrete scan manner.

In the detection mode, since the driving circuits 110-1 to 110-3 may sequentially scan non-adjacent scan lines in the discrete scan manner respectively, and sequentially read charge signals in the light sensing elements in these scan lines, these readout charge signals may probably cause an abnormal image (or loss image) in a signal image generated in the value reading mode. However, compared with the prior art, in the detection mode, the driving circuit sequentially scans the non-adjacent scan lines in the discrete scan manner, which may reduce a width of the loss image and facilitate subsequent signal compensation (refer to the subsequent description).

Figure 2:
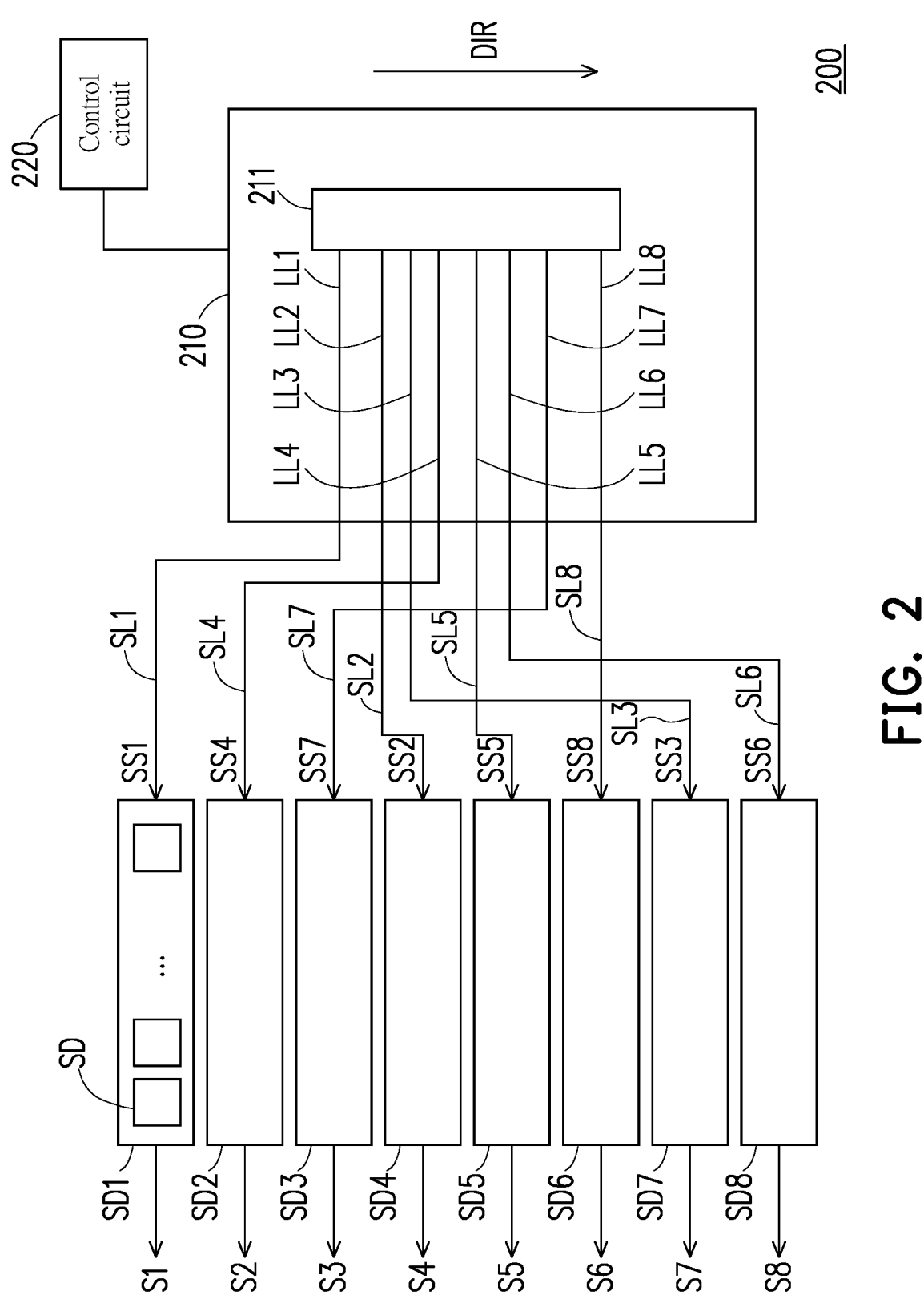
FIG. 2 is a schematic diagram of a light detection device according to a second embodiment of the disclosure.
Figure 3:
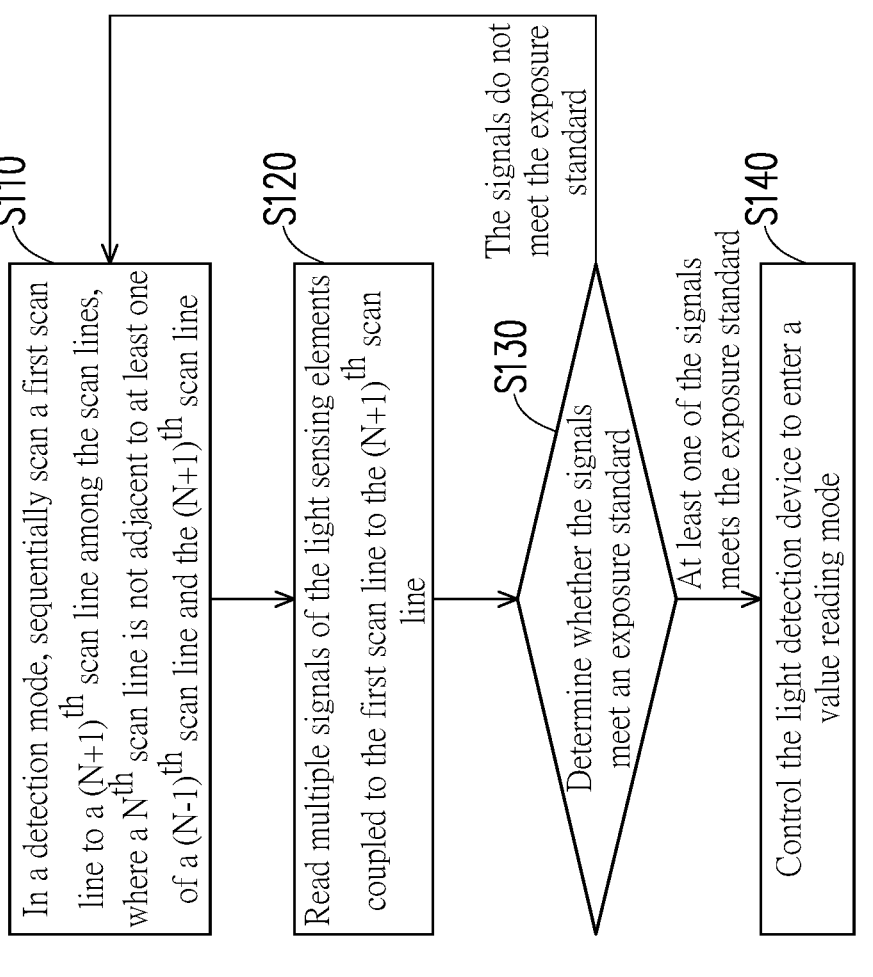
FIG. 3 is a flowchart of a light detection method according to an embodiment of the disclosure.

Referring to FIG. 2 and FIG. 3, FIG. 2 is a schematic diagram of a light detection device according to a second embodiment of the disclosure. FIG. 3 is a flowchart of a light detection method according to an embodiment of the disclosure. In the embodiment, a light detection device 200 includes multiple light sensing elements SD, multiple scan lines SL1 to SL8 and/or at least one driving circuit 210, but the disclosure is not limited thereto. The driving circuit 210 in FIG. 2 may apply at least one of the driving circuits 110-1 to 110-3 in FIG. 1. In the embodiment, the light sensing elements SD are, for example, grouped into light sensing element rows SD1 to SD8, and each of the light sensing element rows SD1 to SD8 includes multiple light sensing elements SD. The number of the light sensing element rows may be adjusted according to actual requirements. The driving circuit 210 may be, for example, electrically connected to the light sensing element rows SD1 to SD8 respectively. In the embodiment, each of the light sensing elements SD may be coupled (i.e., electrically connected) to a corresponding one of the scan lines SL1 to SL8. The scan lines SL1 to SL8 may be electrically connected to the driving circuit 210. In the embodiment, the N$^{th}$ scan line is not adjacent to at least one of the (N−1)$^{th}$ scan line and the (N+1)$^{th}$ scan line, but the disclosure is not limited thereto. For example, the scan line SL2 (i.e., N is equal to 2) is not adjacent to at least one of the scan line SL1 and the scan line SL3. The scan line SL3 (i.e., N is equal to 3) is not adjacent to at least one of the scan line SL2 and the scan line SL4, and so on. For example, the light sensing elements SD in the light sensing element row SD1 may be coupled (i.e., electrically connected) to the scan line SL1. The light sensing elements SD in the light sensing element row SD2 are coupled (i.e., electrically connected) to the scan line SL4. The light sensing elements SD in the light sensing element row SD3 are coupled to the scan line SL7. The light sensing elements SD in the light sensing element row SD4 are coupled (i.e., electrically connected) to the scan line SL2. The light sensing elements SD in the light sensing element row SD5 are coupled (i.e., electrically connected) to the scan line SL5. The light sensing elements SD in the light sensing element row SD6 are coupled (i.e., electrically connected) to the scan line SL8. The light sensing elements SD in the light sensing element row SD7 are coupled to the scan line SL3. The light sensing elements SD in the light sensing element row SD8 are coupled to the scan line SL6. It should be noted that the manner that the light sensing elements SD in the light sensing element rows are coupled to the scan lines is only an example, and the disclosure is not limited thereto. The light sensing element rows SD1 to SD8 are, for example, sequentially arranged on the detection panel PN.

In the embodiment, the light detection method is adapted to the operation of the light detection device 200. In step S110, the light detection device 200 operates in the detection mode, and sequentially scans the first scan line to the (N+1)$^{th}$ scan line (SL1 to SL8) among the scan lines, for example, sequentially scans at least two of the scan lines SL1 to SL8, but the disclosure is not limited thereto. It should be noted that the aforementioned sequential scanning of the scan lines means that these scan lines are sequentially scanned in terms of time (timing). Therefore, in the detection mode, the driving circuit 210 may scan at least two of the light sensing element rows (for example, SD1 to SD8) in a discrete scan manner. For example, in the detection mode, the first scan line SL1 and the second scan line SL2 among the scan lines (SL1 to SL8) are sequentially scanned, where the first scan line SL1 and the second scan line SL2 are not adjacent to each other.

Since the driving circuit sequentially scans the non-adjacent scanning lines in the discrete scan manner, the width of the above-mentioned loss image may be reduced subsequently, which avails subsequent signal compensation (referring to the subsequent description). In step S120, the light detection device 200, for example, reads multiple signals S1 to S8 from the light sensing elements SD coupled to the first scan line to the (N+1)$^{th}$ scan line. In the embodiment, the signals (such as S1 to S8) in the light sensing elements SD may be read by the readout circuits (for example, the readout circuits RO-1 to RO-2 in FIG. 1).

In step S130, it is determined whether the signals S1 to S8 meet the exposure standard. When at least one of the read signals (for example, S1 to S8) is determined to meet the exposure standard, it means that the emitted light has been provided to the light detection device 200. Therefore, in step S140, when the exposure standard is met, the light detection device 200 is controlled to enter the value reading mode. On the other hand, when the read signals (for example, S1 to S8) do not meet the exposure standard, it means that the light detection device 200 probably receives background noise. Therefore, the light detection device 200, for example, again performs the operation of step S110.

Figure 4:
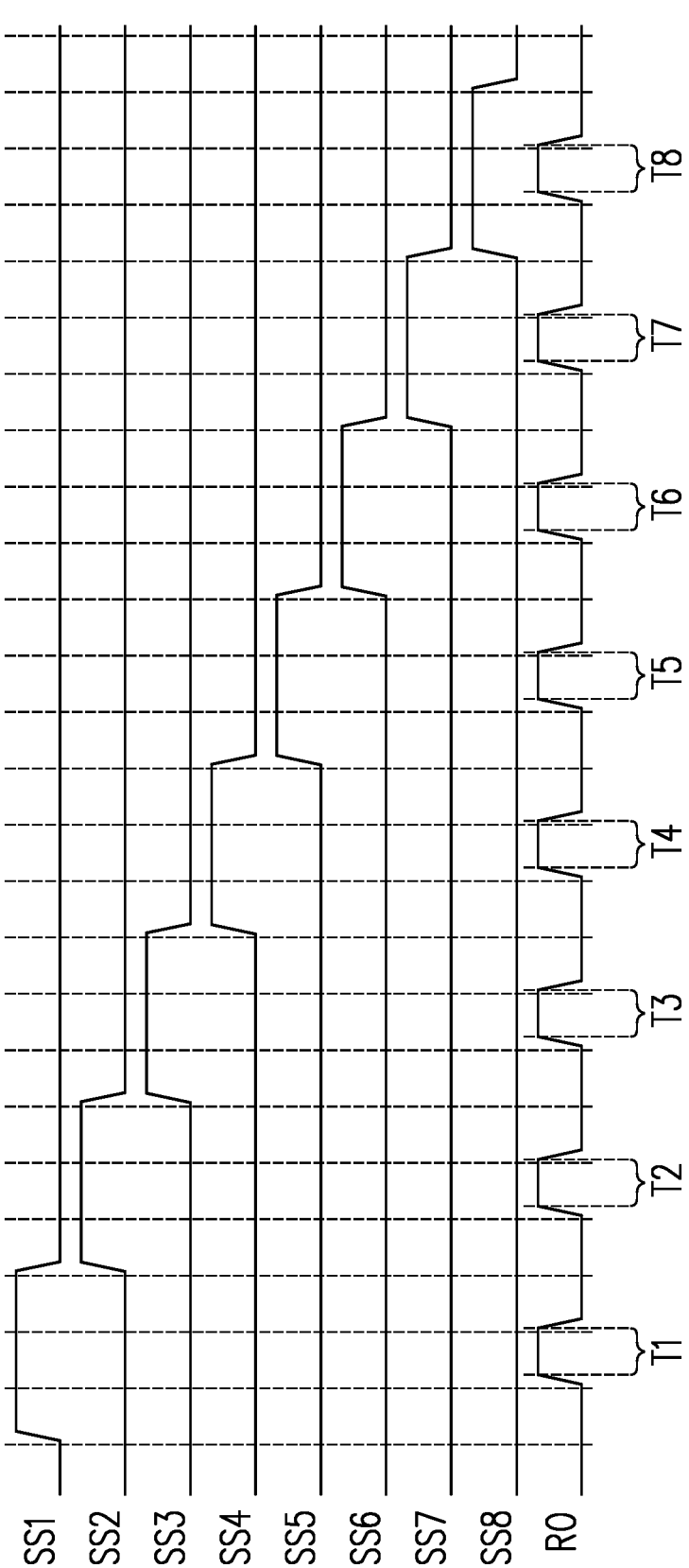
FIG. 4 is a timing diagram of scan signals shown in FIG. 2.

The implementation of steps S110 and S120 is further described below. Referring to FIG. 2 and FIG. 4 at the same time, FIG. 4 is a timing diagram of the scan signals shown in FIG. 2. In the embodiment, the N$^{th}$ scan line is not adjacent to the (N−1)$^{th}$ scan line and/or the (N+1)$^{th}$ scan line. The non-adjacent scan lines mean that positions of these scan lines on the detection panel PN are not adjacent to each other. For example, the position of the scan line SL2 (i.e., N equals 2) and the positions of the scan lines SL1 and SL3 on the detection panel PN are not adjacent to each other. The position of the scan line SL3 (i.e., N equals 3) and the positions of the scan lines SL2 and SL4 on the detection panel PN are not adjacent to each other, and so on.

Referring to FIG. 2, the driving circuit 210 includes, for example, a first output line to an (N+1)$^{th}$ output line sequentially arranged along an arrangement direction DIR, such as output lines LL1 to LL8. The first output line to the (N+1)$^{th}$ output lines (LL1 to LL8) are electrically connected to the first to (N+1)$^{th}$ scan lines respectively. In other words, the output lines (for example, the output lines LL1 to LL8) are electrically connected to the scan lines (for example, scan lines SL1 to SL8) in a one-to-one manner. For example, the output line LL1 is electrically connected to the scan line SL1, the output line LL2 is electrically connected to the scan line SL2, the output line LL3 is electrically connected to the scan line SL3, and so on. In some embodiments, the driving circuit 210 sequentially transmits scan signals (such as scan signals SS1 to SS8) through the first output line to the (N+1)$^{th}$ output line (such as the output lines LL1 to LL8), but the disclosure is not limited thereto. Therefore, based on the arrangement of the scanning lines SL1 to SL8, the driving circuit 210 may scan the light sensing element rows (for example, the light sensing element rows SD1 to SD8) in the discrete scan manner, but the disclosure is not limited thereto. It should be noted that the number of the output lines coupled to the driving circuit 210 is not limited to eight, and the number of the output lines may be adjusted according to actual requirements.

Moreover, as shown in FIG. 4, pulse waves of a readout clock RO, for example, correspond to pulse waves of the scan signals SS1 to SS8. In FIG. 4, the pulse waves of the scan signals SS1 to SS8 may be expressed as "providing the scan signals", and the pulse waves of the readout clock RO may be expressed as "reading charges in the scanned light sensing element rows". In detail, the scan signals SS1 to SS8 are transmitted at different timings to scan the light sensing element rows (for example, the light sensing element rows SD1 to SD8), and the readout circuit (such as the readout circuit in FIG. 1) respectively reads the charges in the scanned light sensing element rows at different timings (for example, a time interval T1 to a time interval T8) according to the readout clock RO. For example, after the scan signal SS1 is provided, a charge (such as the signal S1) in the scanned light sensing element row (for example, the light sensing element row SD1) is read during the time interval T1. Then, after the scan signal SS2 is provided, a charge (such as the signal S4) in the scanned light sensing element row (for example, the light sensing element row SD4) is read during the time interval T2. Then, after the scan signal SS3 is provided, a charge (such as the signal S7) in the scanned light sensing element row (for example, the light sensing element row SD7) is read during the time interval T3, and so on.

In some embodiments, as shown in FIG. 4, a time duration of the pulse wave of the readout clock RO is, for example, shorter than a time duration of the pulse wave of the scan signal, but the disclosure is not limited thereto. It should be noted that the number of scan signals or the number of the pulse waves of the readout clock RO are only an example. Therefore, these signals (for example, the signals S1 to S8) may be respectively read out in different time intervals based on the readout clock RO. For example, in the time interval T1, the signal S1 of the light sensing element SD in the light sensing element row (for example, SD1 of FIG. 2) coupled (i.e., electrically connected) to the scan line SL1 may be read out. In the time interval T2, the signal S4 of the light sensing element SD in the light sensing element row (such as SD4 in FIG. 2) coupled (i.e., electrically connected) to the scan line SL2 may be read out. In the time interval T3, the signal S7 of the light sensing element SD in the light sensing element row (such as SD7 in FIG. 2) coupled (i.e., electrically connected) to the scan line SL3 may be read out. In the time interval T4, the signal S2 of the light sensing element SD in the light sensing element row (such as SD2 in FIG. 2) coupled (i.e., electrically connected) to the scan line SL4 may be read out. In the time interval T5, the signal S5 of the light sensing element SD in the light sensing element row (such as SD5 in FIG. 2) coupled (i.e., electrically connected) to the scan line SL5 may be read out. In the time interval T6, the signal S8 of the light sensing element SD in the light sensing element row (such as SD8 in FIG. 2) coupled (i.e., electrically connected) to the scan line SL6 may be read out. In the time interval T7, the signal S3 of the light sensing element SD in the light sensing element row (such as SD3 in FIG. 2) coupled (i.e., electrically connected) to the scan line SL7 may be read out. In the time interval T8, the signal S6 of the light sensing element SD in the light sensing element row (such as SD6 in FIG. 2) coupled (i.e., electrically connected) to the scan line SL8 may be read out. The above-mentioned signals S1 to S8 are read out in a discrete manner.

In some embodiments, in the value reading mode, the signals S1 to S8 are not read out sequentially. Therefore, in the value reading mode, the signals S1 to S8 may be rearranged to reconstruct the signal image.

In some embodiments, as shown in FIG. 2, the light detection device 200 further includes a control circuit 220. The control circuit 220 may be electrically connected to the driving circuit 210. The control circuit 220 controls the first output line to the (N+1)$^{th}$ output line (for example, the output lines LL1 to LL8) in the driving circuit 210 to transmit the scan signals SS1 to SS8. The driving circuit 210 includes a scan signal generator 211. The scan signal generator 211, for example, sequentially generates the scan signals SS1 to SS8 according to the control circuit 220, but the disclosure is not limited thereto.

Figure 5A:
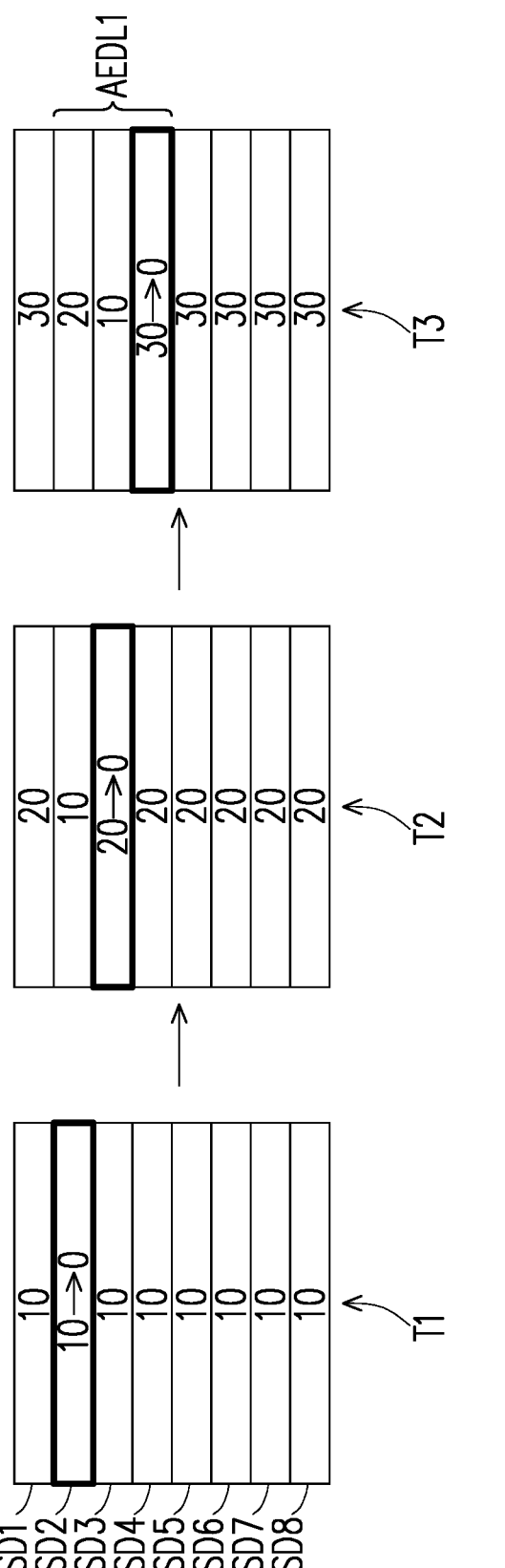
FIG. 5A is a schematic diagram of a current AED scan mode.

Referring to FIG. 5A, FIG. 5A is a schematic diagram of a current AED scan mode. In the current AED scan mode, charge amounts of the light sensing element rows SD1 to SD8 are sequentially read. In FIG. 5A, the values may represent the charge amounts, and the charge amounts corresponds to intensities of the signals in the light sensing element rows SD1 to SD8. In the time interval T1, the charge amounts of the light sensing element rows SD1 to SD8 are, for example, accumulated to "10". In the time interval T1, the charges stored in the light sensing element row SD2 are read out and then reset to zero. The exposure standard includes a threshold. The threshold in the embodiment is, for example, set to "28", but the disclosure is not limited thereto. In the time interval T1, the charge amounts in the light sensing element rows SD1 to SD8 are all, for example, less than the threshold. Namely, in the time interval T1, the signals of the light sensing element rows SD1 to SD8 do not meet the exposure standard.

In the time interval T2, the charges in the light sensing element rows SD1, SD3 to SD8 are accumulated to "20". The charge in the light sensing element row SD2 is accumulated to "10". In the time interval T2, the charge stored in the light sensing element row SD3 is read out and then reset to zero. In the time interval T2, the charge amounts in the light sensing element rows SD1 to SD8 are, for example, all smaller than the threshold. Namely, in the time interval T2, the signals of the light sensing element rows SD1 to SD8 do not meet the exposure standard.

In the time interval T3, the charges in the light sensing element rows SD1, SD4 to SD8 are accumulated to "30". The charge in the light sensing element row SD2 is accumulated to "20". The charge in the light sensing element row SD3 are accumulated to "10". In the time interval T3, the charge stored in the light sensing element row SD4 is read out and then reset to zero. The charge amounts in the light sensing element rows SD1, SD5 to SD8 are, for example, all greater than the threshold. Namely, the signals of the light sensing element rows SD1 to SD8 conform to the exposure standard.

Figure 5B:
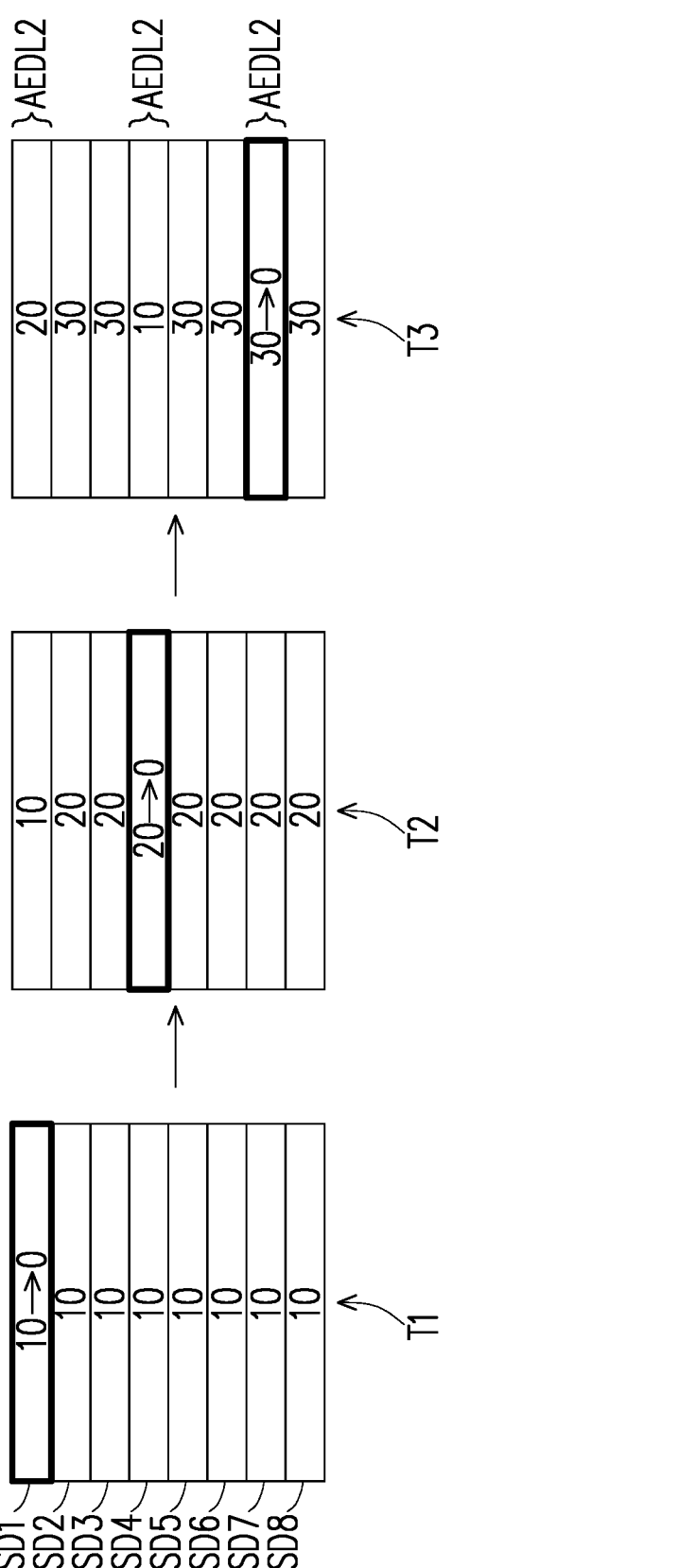
FIG. 5B is a schematic diagram of an AED scan mode according to the disclosure.

It should be noted that since the charges in the light sensing element rows SD2 to SD4 are respectively read out during the time interval T1 to the time interval T3, the charge amounts in the light sensing element rows SD2 to SD4 are insufficient compared to the charge amounts in other unread light sensing element rows (for example, the light sensing element rows SD1, SD5 to SD8). This will cause the intensities of the signals (such as the signals S2, S3, S4) generated corresponding to the light sensing element rows SD2 to SD4 to be smaller than that actually sensed in the subsequent value reading stage. Therefore, abnormal images (or referred to as loss images AED1) may exist in subsequently generated images. A width of the loss image AED1 is, for example, related to a number and a position relationship of the scanned and read light sensing element rows SD2 to SD4 in the detection mode. In addition, as an amount and/or threshold of the emitted light changes, the width of the loss image AEDL1 also changes. This kind of abnormal image is difficult to be eliminated through compensation. Referring to FIG. 2 and FIG. 5B at the same time, FIG. 5B is a schematic diagram of an AED scan mode according to the disclosure. For the convenience of illustration, FIG. 5A and FIG. 5B show the light sensing element rows SD1 to SD8 arranged in the same manner. The AED scan mode disclosed in the disclosure is performed in a discrete scan manner. In the time interval T1, the charges in the light sensing element rows SD1 to SD8 are accumulated to "10". In the time interval T1, the charge stored in the light sensing element row SD1 is read out and then reset to zero. Similarly, the threshold of the embodiment is, for example, set to "28". In the time interval T1, the charge amounts in the light sensing element rows SD1 to SD8 are all less than the threshold. Namely, in the time interval T1, the signals of the light sensing element rows SD1 to SD8 do not meet the exposure standard.

In the time interval T2, the charges in the light sensing element rows SD2 to SD8 are accumulated to "20". In the time interval T2, the charge in the light sensing element row SD1 is accumulated to "10". In the time interval T2, the charge stored in the light sensing element row SD4 is read out and then reset to zero. In the time interval T2, the charges in the light sensing element rows SD1 to SD8 are all less than the threshold. Namely, in the time interval T2, the signals of the light sensing element rows SD1 to SD8 also do not meet the exposure standard.

In the time interval T3, the charges in the light sensing element rows SD2 to SD3, SD5 to SD8 are accumulated to "30". The charge in the light sensing element row SD1 is accumulated to "20". The charge in the light sensing element row SD4 is accumulated to "10". In the time interval T3, the charge stored in the light sensing element row SD7 is read out and then reset to zero. The charge amounts in the light sensing element rows SD2 to SD3, SD5 to SD8 are greater than the threshold. Namely, at least one of the signals S1 to S8 in the light sensing element rows SD1 to SD8 meets the exposure standard. In other words, the above exposure standard includes a threshold, it is determined whether the multiple signals (such as signals S1 to S8) meet the exposure standard, and this step includes determining whether the charge amounts corresponding to the multiple signals (such as the signals S1 to S8) are greater than the threshold, and determining that the multiple signals meet the exposure standard when the charge amount corresponding to one of the multiple signals (such as the signals S1 to S8) is greater than the threshold. Then, the light detection device 200 enters into the value reading mode.

Since the charge amounts in the light sensing element rows SD1, SD4, and SD7 are respectively read out in the time interval T1 to T3, the charge amounts of the light sensing element rows SD1, SD4, and SD7 are insufficient compared to the charge amounts of other unread light sensing element rows (such as the light sensing element rows SD2, SD3, SD5, SD6, SD8). Therefore, in the value reading mode, the intensities of the signals S1, S4, S7 are, for example, smaller than those actually sensed. Therefore, there will be abnormal images (or referred to as loss images) AEDL2 in the subsequently generated images. However, since the light sensing element rows SD1, SD4, and SD7 are not adjacent to each other on the detection panel PN, the abnormal images AEDL2 existing in the generated images are not adjacent to each other. Since the signals S1 to S8 of the disclosure are read out in the discrete manner, an individual width of the abnormal images (the loss images AEDL2) generated by the AED scan mode is substantially equal to a width of the single light sensing element row. The width of the abnormal image (the loss image AEDL2) is relatively is not affected by the change of the amount and/or threshold of the emitted light. Based on the above-mentioned discontinuous abnormal images (the loss images AEDL2), after the value reading mode, the abnormal images may be eliminated through a compensation step.

For example, after executing the value reading mode, the light detection method performs a compensation step to compensate multiple signals in the light sensing elements SD coupled to the first scan line to the $(N+1)^{th}$ scan line read in the detection mode. For example, the light detection method performs the compensation step to compensate the signals (such as signals S1, S4, S7) in the light sensing element rows (such as the light sensing element rows SD1, SD4, SD7) read in the detection mode. Taking compensation of the signal S1 as an example, the light detection device 200 may use the signal S2 in the light sensing element row SD2 adjacent to the light sensing element row SD1 to compensate the signal S1, but the disclosure is not limited thereto. In this way, the abnormal image of the signal S1 may be eliminated. Taking compensation of the signal S4 as an example, the light detection device 200 may use at least one of the signal S3 in the light sensing element row SD3 and the signal S5 in the light sensing element row SD5 adjacent to the light sensing element row SD4 to compensate the signal S4, but the disclosure is not limited thereto. In other words, for example, the intensity of the signal S4 is compensated to be substantially equal to an intensity average of the signal S3 and the signal S5, but the disclosure is not limited thereto. In other embodiments, the light detection device 200 may use the intensity of the signal S3 (or the signal S5) to compensate the signal S4, but the disclosure is not limited thereto. In other words, for example, the intensity of the signal S4 is compensated to be substantially equal to the intensity of the signal S3 (or the signal S5), but the disclosure is not limited thereto. In this way, the abnormal image of the signal S4 may be eliminated. Taking compensation of the signal S7 as an example, the light detection device 200 may use at least one of the signal S6 in the light sensing element row SD6 and the signal S8 in the light sensing element row SD8 adjacent to the light sensing element row SD7 to compensate the signal S7, but the disclosure is not limited thereto. In other words, for example, the intensity of the signal S7 is compensated to be substantially equal to an intensity average of the signal S6 and the signal S8, but the disclosure is not limited thereto. In other embodiments, the light detection device 200 may use the intensity of the signal S6 (or the signal S8) to compensate the signal S7, but the disclosure is not limited thereto. In other words, for example, the intensity of the signal S7 is compensated to be substantially equal to the intensity of the signal S6 (or the signal S8), but the disclosure is not limited thereto. In this way, the abnormal image of the signal S7 may be eliminated.

Figure 6:
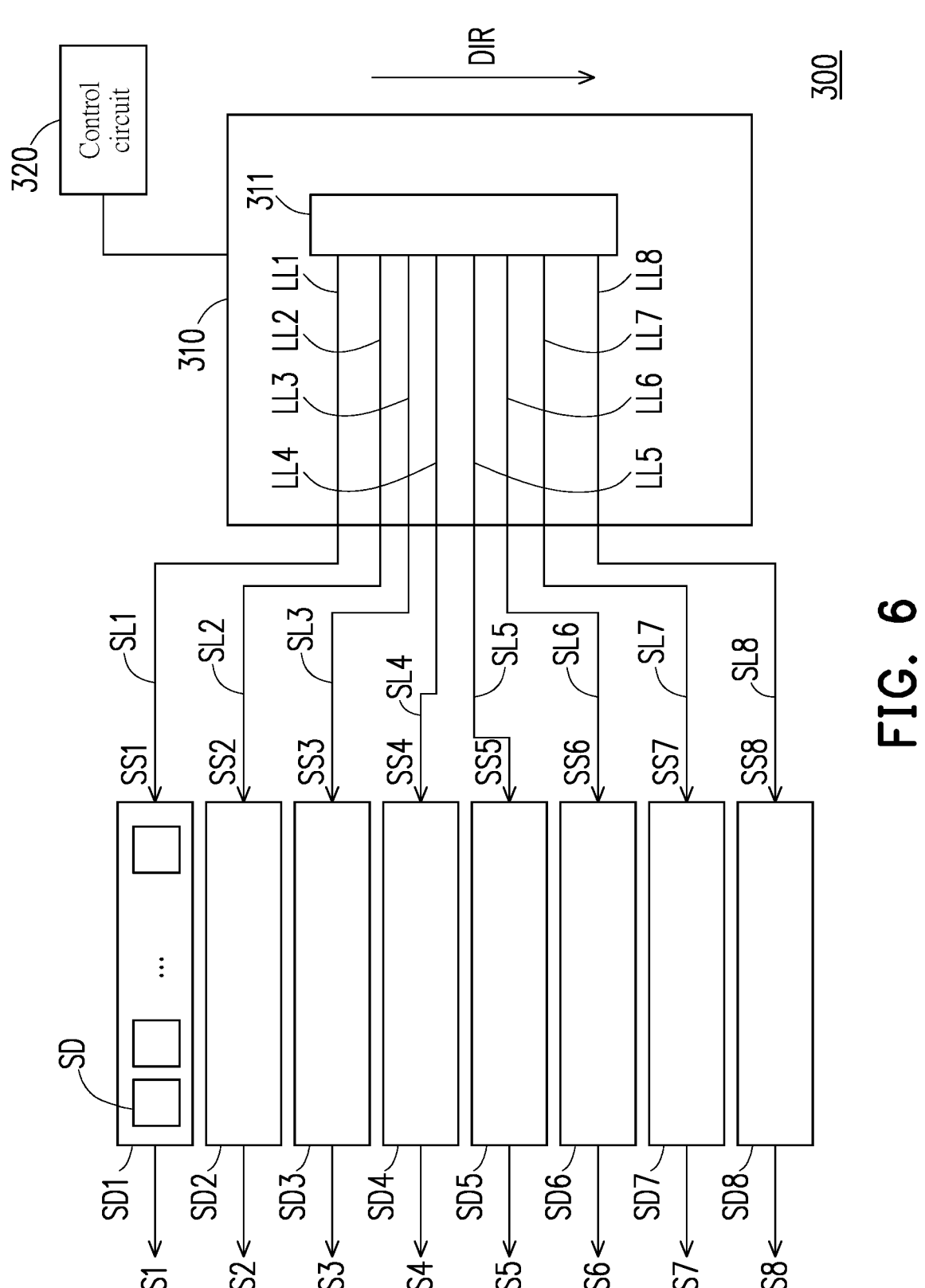
FIG. 6 is a schematic diagram of a light detection device according to a third embodiment of the disclosure.

Referring to FIG. 6, FIG. 6 is a schematic diagram of a light detection device according to a third embodiment of the disclosure. In the embodiment, the light detection device 300 includes multiple light sensing elements SD, scan lines SL1 to SL8, a driving circuit 310 and a control circuit 320. The light sensing elements SD are, for example, grouped into light sensing element rows SD1 to SD8. Each of the light sensing element rows SD1 to SD8 includes at least one light sensing element SD. Each of the light sensing elements SD is coupled to a corresponding one of the scan lines SL1 to SL8. In the embodiment, the scan line SL1 is, for example, connected to the light sensing element row SD1, the scan line SL2 is, for example, connected to the light sensing element row SD2, the scan line SL3 is, for example, connected to the light sensing element row SD3, and so on. The scan lines SL1 to SL8 are electrically connected to the driving circuit 310. It should be noted that the number of scan lines electrically connected to the driving circuit 310 is 8, but the disclosure is not limited thereto.

The driving circuit 310 includes multiple output lines (such as output lines LL1 to LL8) arranged along the arrangement direction DIR, but the disclosure is not limited thereto. It should be noted that the number of the output lines of the driving circuit 310 is 8, but the disclosure is not limited thereto. The output lines LL1 to LL8 are, for example, electrically connected to the scan lines SL1 to SL8 in a one-to-one manner. In the embodiment, the output line LL1 is, for example, electrically connected to the scan line SL1. The output line LL2 is, for example, electrically connected to the scan line SL2. The output line LL3 is, for example, electrically connected to the scan line SL3. The output line LL4 is, for example, electrically connected to the scan line SL4. The output line LL5 is, for example, electrically connected to the scan line SL5. The output line LL6 is, for example, electrically connected to the scan line SL6. The output line LL7 is, for example, electrically connected to the scan line SL7. The output line LL8 is, for example, electrically connected to the scan line SL8. It should be noted that the manner that the output lines are electrically connected to the scan lines is just an example, and the disclosure is not limited thereto.

The driving circuit 310 non-sequentially transmits the scan signals SS1 to SS8 through the output lines LL1 to LL8. The driving circuit 310 further includes a scan signal generator 311. The scan signal generator 311 non-sequentially generates the scan signals SS1 to SS8 according to the control of the control circuit 320.

Figure 7:
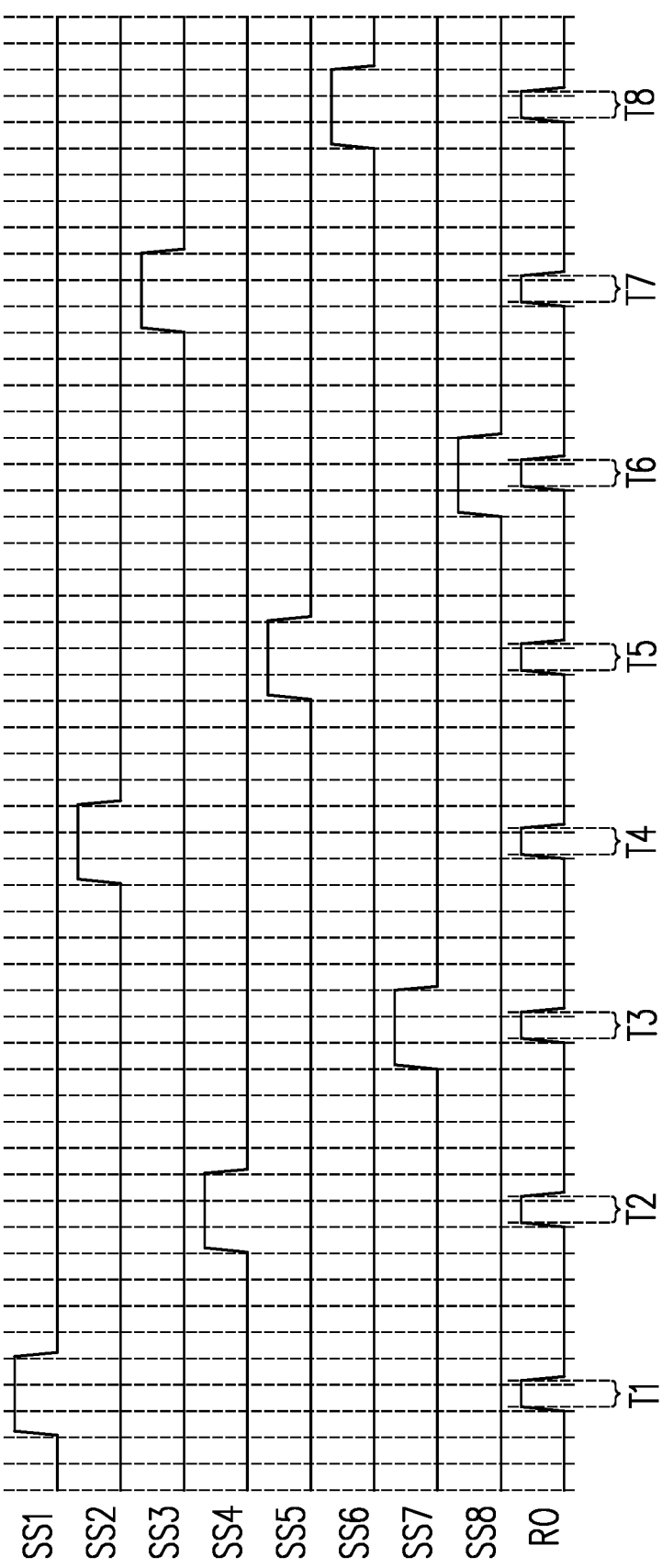
FIG. 7 is a timing diagram of scan signals shown in FIG. 6.

Referring to FIG. 6 and FIG. 7 at the same time, FIG. 7 is a timing diagram of the scan signals shown in FIG. 6. In the embodiment, based on the control of the control circuit 320, the scan signal generator 311 may sequentially generate the scan signals SS1, SS4, SS7, SS2, SS5, SS8, SS3, SS6, but the disclosure is not limited thereto. In other words, the light detection method includes non-sequentially transmitting the scan signals (SS1 to SS8) through the first output line to the $(N+1)^{th}$ output line (LL1 to LL8). For example, the output line LL1, the output line LL4, the output line LL7, the output line LL2, the output line LL5, the output line LL8, the output line LL3 and the output line LL6, for example, sequentially transmit the scan signals, so that the light detection method may non-sequentially transmit the scan signals (SS1 to SS8). Therefore, based on the timing in FIG. 7, the driving circuit 310 may scan the light sensing element rows SD1 to SD8 in the discrete scan manner. The example of the AED scan mode generated in the embodiment is similar to the result shown in FIG. 5B, so that detail thereof is not repeated.

In the embodiment of FIG. 6, in the value reading mode, the signals S1 to S8 may be sequentially read out. Therefore, in the value reading mode, the signals S1 to S8 do not need to be rearranged to reconstruct the signal image.

Figure 8:
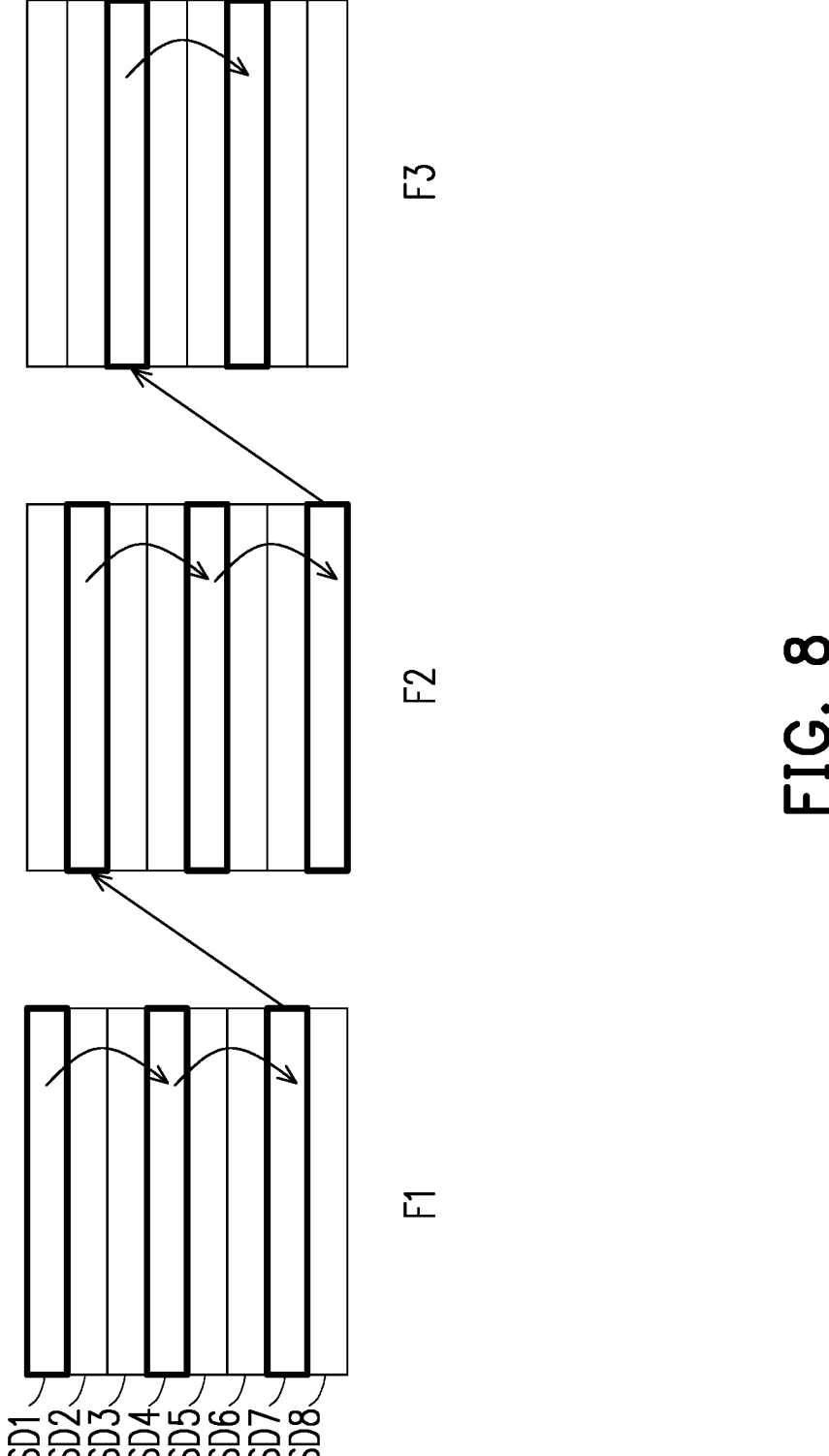
FIG. 8 is a schematic diagram of the AED scan mode shown in FIG. 6.

Referring to FIG. 6 and FIG. 8 at the same time, FIG. 8 is a schematic diagram of the AED scan mode shown in FIG. 6. In the detection mode, the number of the scan lines (SL1 to SL8) is (N+1), the number of spaced scan lines between the first scan line and the second scan line scanned in sequence is M, and the greatest common factor of (N+1) and M is equal to 1. In detail, in the detection mode, in order to make the charges in the sensing element rows SD1 to SD8 all going through zeroing (i.e., being discharged) or not being read repeatedly, the greatest common factor of the total number (i.e., (N+1)) of the scan lines SL1 to SL8 connected to the single driving circuit 310 and the number of the spaced scan lines is, for example, designed to be 1, but the disclosure is not limited thereto. In the embodiment, the number of the scan lines SL1 to SL8 is, for example, "8". The number of spaced scan lines between the first scan line and the second scan line scanned in sequence is "3" (i.e., the scan line SL1 and the scan line SL4 are spaced by 3 Scan lines, and the scan line SL4 and the scan line SL7 are spaced by 3 scan lines). The greatest common factor of the number of scan lines SL1 to SL8 (for example, 8) and the number of the spaced scan lines (for example, 3) is equal to 1. The first scan line to the second scan line are not adjacent to each other (i.e., they are not adjacent to each other in the detection panel PN).

For example, as shown in FIG. 7 and FIG. 8, based on the above design, during a frame period F1, the charge in the light sensing element row SD1 is, for example, read out first and reset to zero. Subsequently, the charge in the light sensing element row SD4 is read out and reset to zero. Then, the charge in the light sensing element row SD7 is read out and reset to zero. During a frame period F2, the charge in the light sensing element row SD2 is read out first and reset to zero. Subsequently, the charge in the light sensing element row SD5 is read out and reset to zero. Then, the charge in the light sensing element row SD8 is read out and reset to zero. During a frame period F3, the charge in the light sensing element row SD3 is read out first and reset to zero. Then, the charge in the light sensing element row SD6 is read out and reset to zero. Therefore, during the frame periods F1 to F3, the charges in the light sensing element rows SD1 to SD8 are all read out and reset to zero, but the disclosure is not limited thereto. Therefore, in the detection mode, the charge of at least one of the light sensing element rows SD1 to SD8 will not be accumulated for a long time to be greater than the threshold of the exposure standard. Therefore, misjudgement of the exposure standard may be reduced.

Figure 9:
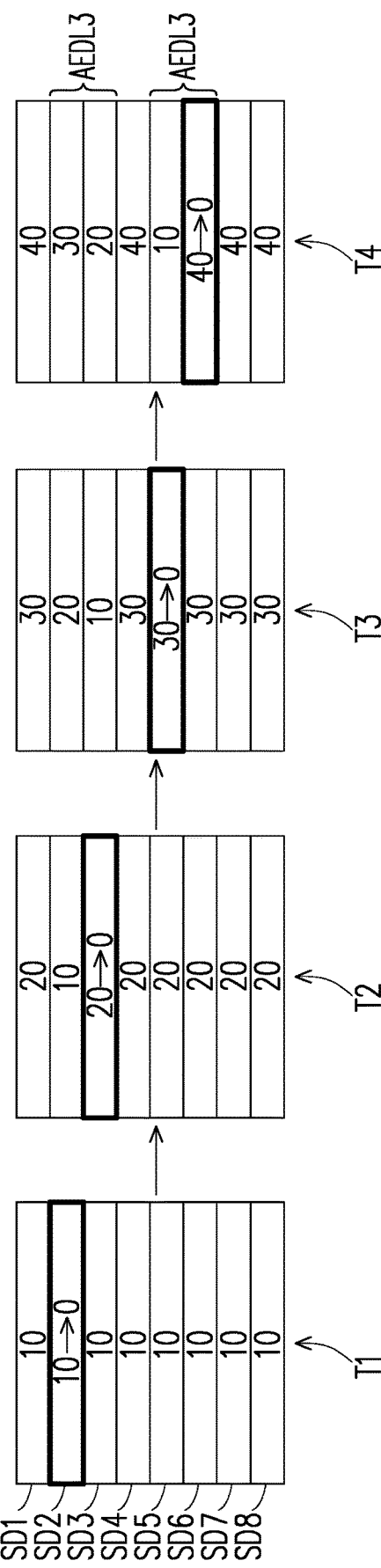
FIG. 9 is a schematic diagram of the AED scan mode according to an embodiment of the disclosure.

Referring to FIG. 9, FIG. 9 is a schematic diagram of the AED scan mode according to an embodiment of the disclosure. In the embodiment, the $N^{th}$ scan line is adjacent to one of the $(N-1)^{th}$ scan line and the $(N+1)^{th}$ scan line, and is not adjacent to the other one of the $(N-1)^{th}$ scan line and the $(N+1)^{th}$ scan line. This makes the signals of at least one pair of light sensing element rows among the light sensing element rows SD1 to SD8 to be read out in sequence. Each pair of the light sensing element rows are, for example, not adjacent to each other. Taking the embodiment as an example, the signals of the light sensing element rows SD2 and SD3 are, for example, respectively read out in the time interval T1 and the time interval T2 in sequence. Then, the signals of the light sensing element rows SD5 and SD6 are, for example, respectively read in the time interval T3 and the time interval T4 in sequence. Therefore, the width of the abnormal image (the loss image AEDL3) is, for example, reduced. For example, the width of the loss image AEDL3 substantially corresponds to a width of two rows of light sensing elements. Similarly, the signals of the subsequent light sensing element rows SD2 and SD3 may be compensated by using the signals of the light sensing element rows SD1 and SD4. The signals of the light sensing element rows SD5 and SD6 may be compensated by using the signals of the light sensing element rows SD4 and SD7.

Figure 10:
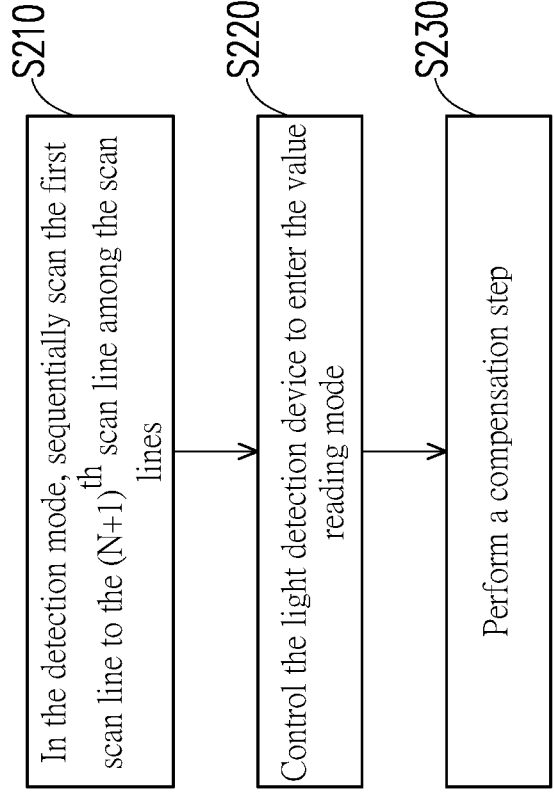
FIG. 10 is a flowchart of a light detection method according to an embodiment of the disclosure.

Referring to FIG. 2 and FIG. 10 at the same time, FIG. 10 is a flowchart of a light detection method according to an embodiment of the disclosure. In the embodiment, the light detection device 200 operates in the detection mode in step S210 and scans the scan lines SL1 to SL8 sequentially. In the detection mode, the driving circuit 210 may scan the light sensing element rows SD1 to SD8 in the discrete scan manner. The implementation details of the discrete scan manner are sufficiently taught in the foregoing illustrated embodiments, and details thereof are not repeated.

In step S220, the light detection device 200 enters into the value reading mode. After executing the value reading mode, the light detection device 200 performs a compensation step in step S230 to compensate the signals of the light sensing element rows read in the detection mode, thereby eliminating the abnormal image.

In summary, the $N^{th}$ scan line of the disclosure is not adjacent to at least one of the $(N-1)^{th}$ scan line and the $(N+1)^{th}$ scan line. The light detection method adopts the discrete scan manner to perform light detection. Therefore, the width of the abnormal image (or referred to as loss image) in the signal image generated by the light detection device is reduced. The abnormal image mentioned above may be compensated in the compensating step.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A light detection method for a light detection device, wherein the light detection device comprises a plurality of scan lines and a plurality of light sensing elements, wherein each of the light sensing elements is coupled to a corresponding one of the scan lines, the scan lines are electrically connected to a driving circuit, and the light detection method comprises:

in a detection mode, sequentially scanning a first scan line to a $(N+1)^{th}$ scan line among the scan lines, wherein a $N^{th}$ scan line is not adjacent to at least one of a $(N-1)^{th}$ scan line and the $(N+1)^{th}$ scan line;

in the detection mode, reading a plurality of signals of the light sensing elements coupled to the first scan line to the $(N+1)^{th}$ scan line and then resetting a charge in a light sensing element row of the light sensing elements to zero after the charge in the light sensing element row is read out;

determining whether the signals meet an exposure standard; and controlling the light detection device to enter a value reading mode when the signals meet the exposure standard.

2. The light detection method according to claim 1, wherein the $N^{th}$ scan line is not adjacent to the $(N-1)^{th}$ scan line and the $(N+1)^{th}$ scan line.

3. The light detection method according to claim 1, wherein the driving circuit comprises a first output line to a $(N+1)^{th}$ output line arranged along an arrangement direction, and the first output line to the $(N+1)^{th}$ output line are respectively electrically connected to a corresponding one of the first scan line to the $(N+1)^{th}$ scan line, wherein the light detection method further comprises:

sequentially transmitting scan signals through the first output line to the $(N+1)^{th}$ output line.

4. The light detection method according to claim 1, wherein the driving circuit comprises a first output line to a $(N+1)^{th}$ output line arranged along an arrangement direction, and the first output line to the $(N+1)^{th}$ output line are respectively electrically connected to the first scan line to the $(N+1)^{th}$ scan line, wherein the light detection method further comprises:

non-sequentially transmitting scan signals through the first output line to the $(N+1)^{th}$ output line.

5. The light detection method according to claim 4, wherein the light detection device further comprises a control circuit electrically connected to the driving circuit, and the light detection method further comprises:

controlling an order that the first output line to the $(N+1)^{th}$ output line transmit the scan signals by the control circuit.

6. The light detection method according to claim 4, wherein a number of the scan lines is $(N+1)$, a number of spaced scan lines between the first scan line and a second scan line scanned in sequence is M, and a greatest common factor of $(N+1)$ and M is equal to 1.

7. The light detection method according to claim 1, wherein the exposure standard comprises a threshold, wherein determining whether the signals meet the exposure standard comprises:

determining whether a charge amount corresponding to the signals is greater than the threshold; and when the charge amount corresponding to one of the signals is greater than the threshold, determining that the signals meet the exposure standard.

8. The light detection method according to claim 7, wherein determining whether the signals meet the exposure standard further comprises:

when the charge amounts corresponding to the signals are less than or equal to the threshold, determining that the signals do not meet the exposure standard.

9. The light detection method according to claim 1, further comprising:

after executing the value reading mode, performing a compensation step to compensate the signals of the light sensing elements coupled to the first scan line to the $(N+1)^{th}$ scan line read in the detection mode.

10. A light detection method for a light detection device, wherein the light detection device comprises a plurality of scan lines and a plurality of light sensing elements, wherein each of the light sensing elements is coupled to a corresponding one of the scan lines, the scan lines are electrically connected to a driving circuit, and the light detection method comprises:

in the detection mode, sequentially scanning a first scan line and a second scan line among the scan lines, wherein the first scan line is not adjacent to the second scan line;

in the detection mode, reading a plurality of signals of the light sensing elements coupled to the first scan line and the second scan line and then resetting a charge in a light sensing element row of the light sensing elements to zero after the charge in the light sensing element row is read out;

determining whether the signals meet an exposure standard; and controlling the light detection device to enter a value reading mode when the signals meet the exposure standard.

11. The light detection method according to claim 10, wherein the scan lines comprise the first scan line to a $(N+1)^{th}$ scan line, wherein a $N^{th}$ scan line is not adjacent to a $(N-1)^{th}$ scan line and the $(N+1)^{th}$ scan line.

12. The light detection method according to claim 10, wherein the driving circuit comprises a first output line to a $(N+1)^{th}$ output line arranged along an arrangement direction, and the first output line to the $(N+1)^{th}$ output line are respectively electrically connected to a corresponding one of the scan lines, wherein the light detection method further comprises:

sequentially transmitting scan signals through the first output line to the $(N+1)^{th}$ output line.

13. The light detection method according to claim 10, wherein the driving circuit comprises a first output line to a $(N+1)^{th}$ output line arranged along an arrangement direction, and the first output line to the $(N+1)^{th}$ output line are respectively electrically connected to a corresponding one of the scan lines, wherein the light detection method further comprises:

non-sequentially transmitting scan signals through the first output line to the $(N+1)^{th}$ output line.

14. The light detection method according to claim 13, wherein the light detection device further comprises a control circuit electrically connected to the driving circuit, and the light detection method further comprises:

controlling an order that the first output line to the $(N+1)^{th}$ output line transmit the scan signals by the control circuit.

15. The light detection method according to claim 13, wherein a number of the scan lines is $(N+1)$, a number of spaced scan lines between the first scan line and a second scan line scanned in sequence is M, and a greatest common factor of $(N+1)$ and M is equal to 1.

16. The light detection method according to claim 10, wherein the exposure standard comprises a threshold, wherein determining whether the signals meet the exposure standard comprises:

determining whether a charge amount corresponding to the signals is greater than the threshold; and when the charge amount corresponding to one of the signals is greater than the threshold, determining that the signals meet the exposure standard.

17. The light detection method according to claim 16, wherein determining whether the signals meet the exposure standard further comprises:

when the charge amounts corresponding to the signals are less than or equal to the threshold, determining that the signals do not meet the exposure standard.

18. The light detection method according to claim 10, further comprising:

after executing the value reading mode, performing a compensation step to compensate the signals of the light sensing elements coupled to the scan lines read in the detection mode.

* * * * *